(12) United States Patent
Buehring et al.

(10) Patent No.: US 11,662,463 B2
(45) Date of Patent: May 30, 2023

(54) LIDAR APPARATUS AND METHOD

(71) Applicant: Red Sensors Limited, Leicester (GB)

(72) Inventors: Ian Karl Buehring, Leicester (GB); David Mark Barnett, Leicester (GB)

(73) Assignee: RED SENSORS LIMITED, Leicester (GB)

( * ) Notice: Subject to any disclaimer, the term of this patent is extended or adjusted under 35 U.S.C. 154(b) by 1031 days.

(21) Appl. No.: 16/465,242

(22) PCT Filed: Nov. 30, 2017

(86) PCT No.: PCT/GB2017/053613
§ 371 (c)(1),
(2) Date: May 30, 2019

(87) PCT Pub. No.: WO2018/100379
PCT Pub. Date: Jun. 7, 2018

(65) Prior Publication Data
US 2019/0324145 A1 Oct. 24, 2019

(30) Foreign Application Priority Data
Dec. 2, 2016 (GB) ...................................... 1620503

(51) Int. Cl.
*G01S 17/10* (2020.01)
*G01S 7/481* (2006.01)

(52) U.S. Cl.
CPC ............ *G01S 17/10* (2013.01); *G01S 7/4815* (2013.01); *G01S 7/4817* (2013.01)

(58) Field of Classification Search
CPC ................................................... G01S 7/4817
See application file for complete search history.

(56) References Cited

U.S. PATENT DOCUMENTS

2015/0369917 A1  12/2015  Bridges et al.
2016/0047896 A1*  2/2016  Dussan ................. G01S 7/4817
                                                              356/4.01
(Continued)

FOREIGN PATENT DOCUMENTS

EP  2187232 A2 *  5/2010  ........... G01S 7/4817
EP  2187232 A3     5/2010
WO  2016056545 A1  4/2016

OTHER PUBLICATIONS

International Search Report and Written Opinion [PCT/GB2017/053613] (ISA/EP) dated Feb. 28, 2018.
(Continued)

*Primary Examiner* — Jerry T Jean Baptiste
(74) *Attorney, Agent, or Firm* — Daniel J. Chalker; Edwin S. Flores; Chalker Flores, LLP

(57) ABSTRACT

The present invention provides an improved lidar apparatus (11) that can scan a surrounding volume without requiring the rotation or other movement of any component other than a scanning mirror (17). The apparatus (11) comprises: a receiving lens (16) having an optical axis; the scanning mirror (17) that is angled to the optical axis of the receiving lens (16) and controlled to rotate about the optical axis of the receiving lens; at least one stationary laser source (12) that is positioned to emit light along an associated emission beam path (14) to be reflected by the scanning mirror (17) along an associated scanning beam path (18); and at least one detector (19), associated with a laser source (12) and positioned to receive light from said laser source (12) that is reflected by external objects and returned through the receiving lens (16) via the scanning mirror (17). The apparatus (11) is characterised in that the emission beam path (14) is located at an angle to the optical axis of the receiving lens (16). Embodiment of the invention comprise a plurality of laser sources (12) such that the apparatus can scan a 3D (Continued)

volume surrounding the apparatus (11) whilst holding each source stationary. The present invention also provides an improved method of lidar scanning that utilises any apparatus (11) according to the present invention.

30 Claims, 9 Drawing Sheets

(56) References Cited

U.S. PATENT DOCUMENTS

2016/0306029 A1   10/2016   Lundquist et al.
2020/0256995 A1 *  8/2020   Inoue ..................... G01S 17/32

OTHER PUBLICATIONS

Combined Search and Examination Report [GB1620503.1] EPO dated Apr. 26, 2017.

\* cited by examiner

LIDAR APPARATUS AND METHOD

CROSS-REFERENCE TO RELATED APPLICATIONS

This application is a U.S. National Stage Application of and claims priority to International Application No. PCT/GB2017/053613, filed on Nov. 30, 2017, which claims priority to Great Britain Application No. 1620503.1, filed on Dec. 2, 2016. The contents of foregoing applications are hereby incorporated by reference in their entirety.

TECHNICAL FIELD OF THE INVENTION

The present invention relates to lidar scanning. In particular, the present invention provides an improved lidar scanning apparatus that has no moving parts that are electronic and that can scan an area or volume without requiring the rotation or movement of any component other than a scanning mirror. The present invention also provides an improved lidar method that can scan an area or volume without requiring the rotation or movement of any component of an apparatus other than a scanning mirror.

BACKGROUND OF THE INVENTION

In lidar scanning systems light is used to measure the distance to nearby objects and thereby provide a scan of the nearby environment. Many lidar systems are time of flight lidar systems in which the time that it takes a pulse of light to be reflected from an object and returned to a receiver after it has been emitted is used to calculate the distance the object is from a scanner. Alternative lidar systems use amplitude or phase modulation beam rangefinding, rather than utilising pulses of light. Typically, lidar scanning generates a 3D point cloud model of the immediate surroundings. It is anticipated that this technology will be of increasing importance in coming years, particularly for use with self-driving vehicles in which accurate and rapid detection of moving objects is of paramount importance. Other uses for the technology include robotics, collision avoidance systems, mapping technology, and security systems.

U.S. Pat. No. 5,455,669 (Wetteborn) discloses a typical time of flight scanning lidar apparatus according to the closest prior art to the present invention. In this apparatus a pulsed laser emits light pulses along an emission beam path onto a rotating mirror. The mirror is rotated about an axis of rotation that is coincident with the emission beam path. In this way, as the mirror rotates a pulsed beam is scanned in a detecting plane about the apparatus. Generally, the apparatus is arranged such that the plane that is scanned is horizontal and the emission beam path is vertical. This is achieved by angling the mirror at 45° to the vertical emission beam path. Light is reflected back from objects located in the detecting plane onto the mirror where it is reflected back through a receiving lens, the optical axis of which is coincident with the emission beam path, such that it is focused on a detector. This allows the calculation of the proximity of objects located in the detecting plane. In particular, the proximity of an object can be calculated based on the time at which a pulse of light was emitted, the instantaneous rotational angle of the mirror, and the time at which the returned light is detected by the detector. The apparatus of Wetteborn produces a 2D point cloud model of its surrounding within the detecting plane.

FIG. 1 shows the general concept of the lidar scanner 1 disclosed in Wetteborn. A laser source 2 having a collimating lens produces a laser beam that is directed onto a 45° mirror 3 such that it follows a vertical emission beam path 4 after being reflected off the 45° mirror. The emission beam 4 path passes through a central aperture 5 formed in a horizontally oriented receiving lens 6 and is incident on a scanning mirror 7. The scanning mirror 7 reflects the laser beams along a scanning beam path 8. In use, the scanning mirror 7 is rotated about an axis of rotation that is coincident with the emission beam path 4 so as to scan the scanning beam path 8 either around a circular path or around an arc that forms part of that path. When the laser of the scanning beam path is incident upon an external object at least a portion of the laser light will be reflected back onto the scanning mirror 7 and thereby reflected back down through the receiving lens 6. The receiving lens 6 is formed to focus all such reflected laser light onto a stationary detector 9 positioned on the axis of rotation of the scanning mirror 7. That is, the optical axis of the receiving lens 6 is coincident with the axis of rotation of the scanning mirror 7.

Generally, the laser source 2 is controlled to emit pulses of laser light. By measuring the time taken from the emission of a pulse of laser light by the laser source 2 to the detection of reflected laser light of that pulse by the detector 9 the distance to the object from which the light was reflected can be calculated. If the angle of rotation of the rotating mirror at that moment is also known the location of the object can be determined. In this manner the lidar scanner 1 of Wetteborn can produce a 2D point cloud map of a scanned plane.

A major drawback with the apparatus of Wetteborn is that it can only scan either a plane or a conic section around the apparatus depending on the angle of the beam path exiting the apparatus. It would be advantageous if a lidar scanning apparatus could scan the surroundings in another manner without the need for complex control of the scanning mirror. Further the apparatus of Wetteborn is not capable of producing a full 3D cloud map of the surrounding volume. Scanning in 3D is of vital importance for many systems, particularly self-driving cars.

In light of the problem with the disclosure of Wetteborn, many alternative and 3D time of flight lidar systems have been developed. For example, U.S. Pat. No. 7,969,558 (Hall 1) and U.S. Pat. No. 8,767,190 (Hall 2) disclose complex 3D lidar systems. In particular, these apparatus generally comprise a plurality of linear lidar sensors that are positioned to detect along emission paths that are each at different angles. These linear lidar sensors are then rotated about a central vertical axis to produce a 3D point cloud model of the surrounding area.

The systems of Hall 1 and Hall 2 are complex in that they require the rotation of the linear lidar systems themselves. This results in complex technical issues as the power supply, control signals, and output signals are all required to be transmitted through a rotating coupling. Further, the components of the systems are subject to significant rotational forces.

The problems set out above exist for all prior art lidar scanners. This includes but is not limited to time of flight lidar scanners, phase modulation lidar scanners, and amplitude modulation lidar scanners.

In light of the above, there is a need for an improved lidar scanner that is capable of scanning in something other than a flat plane or conic section without complex control of a scanning mirror, rotation of electronic components or the transmission of electronic signals through a rotating coupling. There is also a need for a lidar scanner that can scan three dimensions quickly and efficiently and that does not require the rotation of electronic components or the transmission of electronic signals through a rotating coupling.

SUMMARY OF THE INVENTION

The present invention provides a lidar apparatus comprising:
- a receiving lens having an optical axis;
- a scanning mirror angled to the optical axis of the receiving lens and controlled to rotate about a scanning axis;
- a stationary laser source that is positioned to emit light along an emission beam path that is reflected by the scanning mirror along an associated scanning beam path;
- a detector associated with the laser source and positioned to receive light from said laser source that is reflected by external objects and returned through the receiving lens and via the scanning mirror;

characterised in that:
the emission beam path is located at an angle to the scanning axis.

The apparatus of the present invention differs from the closest prior art in that the emission beam path is located at an angle to the scanning axis. That is, the emission beam path is neither coincident with the scanning axis nor is it parallel to the scanning axis. The angle to the scanning axis may be any angle that allows the function of the apparatus. For example, the angle may be greater than 0.1°, or greater than 0.5°, or greater than 1°.

The apparatus is advantageous as by angling the emission beam path to the scanning axis it is possible to scan the scanning beam path about a path other than a horizontal plane or a conic section simply by rotating the scanning mirror about the scanning axis. Instead, the beam will sweep a path that varies in angle relative to the rotational axis of the scanning mirror as the mirror is rotated. Advantageously, it is not necessary to rotate or otherwise move either the laser source or the detector nor is it necessary to move the scanning mirror in a complex manner in order to achieve this.

In embodiments of the invention the scanning axis of the mirror may be coincident with the optical axis of the receiving lens such that the scanning mirror is rotated about the optical axis of the receiving lens. This may be preferred as it can simplify the construction of the apparatus.

The laser source may either emit light directly onto the emission beam path or the light may be directed onto the emission beam path by suitable means. For example, the light may be directed by a reflecting mirror for reflecting light emitted from the laser source onto the emission beam path. If the apparatus comprises a plurality of laser sources, as discussed below, then there may be a single reflecting mirror for reflecting light emitted from each laser source onto associated emission beam paths or there may be a plurality of mirrors for reflecting light from said laser sources onto the emission beam paths. A reflecting mirror may be a 45° mirror or any other suitable reflecting means including but not limited to a flat mirror, curved mirror, or a reflective prism.

Generally, the scanning mirror and the receiving lens of the present invention will be separate components. However, in embodiments of the present invention the scanning mirror may be integrally formed with the receiving lens.

Generally, embodiments of the present invention that consist of only a single laser source will also consist of only a single detector. However, some embodiments of the invention consisting of only a single laser source may comprise a plurality of stationary detectors, each detector associated with the stationary laser source and positioned to receive light with said laser source that is reflected by external objects and returned through the receiving lens and via the scanning mirror. Similarly, in embodiments of the invention consisting of a plurality of laser sources, a plurality of detectors may be provided for each laser source. In order to allow light from a single source to operate with a plurality of detectors, after reflection from the environment the light emitted from any specific laser source can be deflected to land on more than one detector. This can be done in any appropriate manner.

As an example, in a time of flight lidar scanning apparatus according to the present invention it may be advantageous to detect the light from a single source with a plurality of detectors as a first detector could be used to detect the time of transmission and a second detector could be used to detect the time of receipt of a pulse.

Although embodiments of the invention may consist of a single laser source, it may be preferable that embodiments of the invention comprise a plurality of stationary laser sources that are each positioned to emit light along an associated and different emission beam path, each said emission beam path being reflected by the scanning mirror along an associated and different scanning beam path. This is advantageous in that any such apparatus can be capable of scanning a 3D volume about the scanner without requiring the rotation of any part other than the scanning mirror. This greatly simplifies the construction of the apparatus as compared to prior art 3D lidar scanners, such as those disclosed in U.S. Pat. No. 7,969,558 (Hall 1) or U.S. Pat. No. 8,767,190 (Hall 2)

In apparatus according to the present invention comprising a plurality of laser sources each emission beam path may be at an angle to the scanning axis. That is, each emission beam path may not be coincident with the rotational axis of the scanning mirror but is angularly offset from said axis. The effect of this angular offset is that when the scanning mirror is rotated the beam from any individual laser source will not sweep a horizontal plane or a conic section, as it would do if it were coincident with the rotational axis of the scanning mirror, as in the prior art. As light from each laser source is emitted along a different and associated emission beam path and each emission beam path is angularly offset from the rotational axis of the scanning mirror, as the scanning mirror is rotated a different scanning beam path of varying angle will be traced by the beam of each laser sources. As the beam paths from each source are different they will not interfere with one another during this scanning. This allows the apparatus to comprise a plurality of stationary laser sources using only a single scanning mirror and a single receiving lens.

If the apparatus comprises a plurality of laser sources the light from each of the plurality of laser sources can either be emitted directly along the associated emission beam path or it can be reflected onto the associated emission beam path, for example by a mirror, in the same manner disclosed in U.S. Pat. No. 5,455,669 (Wetteborn), or by any other suitable means.

When the light from any individual laser source is reflected back onto the scanning mirror by an external object it will be reflected by the scanning mirror back through the receiving lens and focused onto a detector that is associated with said laser source. For example, the receiving lens may be formed to focus the reflected light of any specific laser source onto a focal point that is along an axis that is coincident with the emission beam path of that laser source. A detector may either be positioned at this focal point or the reflected light may be further reflected by an appropriately positioned mirror such as to move the focal point from said axis onto the detector. The position of an object in the path swept by the light from the source can then be calculated based on the time taken for the light from the source to reach the detector and the position of the scanning mirror.

If the apparatus comprises a plurality of laser sources by determining the position of objects along a plurality of scanning beam paths from each of the plurality of laser sources a 3D point cloud can be created. Importantly, in embodiments of the invention the only part of the apparatus of the present invention that is required to rotate or otherwise move is the scanning mirror. Each of the plurality of laser sources may be stationary and the detector or detectors of the apparatus may not be required to be rotated or otherwise moved during operation of the apparatus. As a result, signals to and from these components and the power supply to these components may not be required to be transmitted through a rotating coupling. In this manner, the apparatus of the present invention can provide a greatly simplified apparatus for 3D lidar scanning as compared to the prior art.

In embodiments of the apparatus of the present invention comprising a plurality of laser sources the apparatus may have only a single detector that is associated with each of the plurality of laser sources and is positioned to receive light from each of said laser sources that is reflected by external objects and returned through the receiving lens and via the scanning mirror. That is, a single detector may be used to receive light from each of the plurality of laser sources. This may be achieved by appropriately forming the receiving lens to deflect the incoming light appropriately onto a single focal point at which the single detector is located. Alternatively, the receiving lens may focus reflect light from each of the plurality of laser onto a separate associated focal point and the apparatus may comprise further optical apparatus to move said separate associated focal points onto the single detector.

Alternatively, if the apparatus of the present invention comprises a plurality of laser sources the apparatus may also comprise a plurality of detectors, each detector associated with one or more of the plurality of laser sources and positioned to receive light from said one or more of the plurality of laser sources that is reflected by external objects and returned through the receiving lens and via the scanning mirror. If the apparatus comprises a plurality of laser sources and a plurality of detectors it may be preferable that the apparatus comprises the same number of laser source as detectors and that each laser source has a single detector associated with it. That is, it may be preferable that the apparatus comprises a plurality of laser source and detector pairs, each positioned to scan a different scanning path.

In embodiments of the apparatus of the present invention that comprise a plurality of laser sources, the emission beam paths of the laser sources may be positioned in any manner that allows the apparatus to scan a desired volume surrounding the apparatus. For example, in order to evenly scan a volume surrounding an apparatus it may be advantageous that the emission beam paths of the plurality of laser sources are equally rotationally spaced about the optical axis. In a similar manner it may be advantageous that the emission beam paths are each offset from the optical axis of the receiving lens by the same angle.

If an apparatus of the present invention comprises a plurality of laser sources it may have any appropriate number. For example, embodiments of the invention may have six or more laser sources or twelve or more laser sources.

If the apparatus of the present invention comprises a plurality of laser sources in order to simplify the construction of the apparatus it may be preferable that the laser sources are all mounted in the same plane. This can allow simpler construction of the apparatus for example by mounting the laser sources on a single pcb or integrated circuit.

If the apparatus of the present invention comprises a plurality of laser sources the beams of the laser sources may be collimated in any appropriate manner. Each laser source may comprise an integral collimator or be otherwise formed to produce a collimated beam. Alternatively, the apparatus may comprise a single collimator for collimating the laser beams from each of the laser sources. That is, each laser source may be positioned to emit a laser beam through a single appropriately positioned and formed collimator that acts to collimate the beams. Such a collimator could, for example, be positioned on the optical axis of the receiving lens.

The, or each, laser source of an apparatus of the present invention may be positioned such that each emission beam path passes through the receiving lens. The or each laser source may be positioned either before the receiving lens such that the or each laser source emits light along an emission beam path that passes through the receiving lens before being reflected by the scanning mirror. That is, any laser source of an apparatus of the present invention may be positioned before the receiving lens such that the laser source emits light along an emission beam path that passes through the receiving lens before being reflected by the scanning mirror. Alternatively, a laser source may be positioned after the receiving lens such that the laser source emits light along an emission beam path that does not pass through the receiving lens. All the laser sources may be positioned before the receiving lens. Alternatively, all the laser sources may be positioned after the receiving lens. As a further alternative some of the laser sources may be positioned before the receiving lens and some of the laser sources may be positioned after the receiving lens.

If the emission beam path of any laser source passes through the receiving lens it may be preferable that the receiving lens comprises a central aperture through which each of said emission beam paths pass. This is advantageous as it allows the emission beam paths to pass through the receiving lens without being diverted thereby.

In addition to one or more stationary laser sources that emit light along an emission beam path that is located at an angle to the optical axis of the receiving lens embodiments of the present invention may further comprise an on-axis laser source and an associated on-axis detector wherein the emission beam path of the on-axis laser source is coincident with the scanning axis of the scanning mirror. That is, in addition to the off-axis laser sources and associated detectors, as shown in FIG. 2, embodiments of the present invention may additionally comprise an on-axis laser source and associated detector in the same manner as disclosed in Wetteborn and as shown in FIG. 1.

As set out above, the light from each laser source can either be emitted directly along the associated emission beam path or it can be reflected onto the associated emission beam path, for example by a mirror (e.g. a 45° mirror), in the same manner disclosed in U.S. Pat. No. 5,455,669 (Wetteborn). In embodiments of the invention the apparatus may further comprise a single reflecting mirror for reflecting the light emitted from each of the laser sources onto the associated emission beam paths. Said reflecting mirror may be a 45° mirror that reflects the light from each laser source through an angle of approximately 90° or any other suitable manner.

The control of the or each laser source and the or each detector of an apparatus according to the present invention can be carried out in any manner apparent to the person skilled in the art. If the apparatus comprises a plurality of laser sources that are pulsed during operation of the apparatus they may be controlled to fire simultaneously or in sequence. It may be preferred that a plurality of laser sources are controlled to fire in sequence. Generally, one or more time to digital (TDC) converters will be used to interpret the signals received from the or each detector. Because of this it may be preferable that a plurality of laser sources are controlled to fire in sequence as this can allow a reduction in the number of TDC converters that are required. For example, if all of a plurality of laser sources are controlled to fire in sequence such that no two sources are fired at the same time it may be possible to use a single TDC converter and to share that converter across the or each detector associated with said plurality of laser sources.

Generally, it is anticipated that the apparatus of the present invention will operate using pulsed laser rangefinding techniques, as is common in the art. However, it will be understood that the apparatus of the present invention may operate using alternative laser rangefinding techniques such as phase or amplitude modulated beam rangefinding.

The or each detector of an apparatus according to the present invention may be any suitable component that can detect the laser light reflected from nearby objects. For example, the or each detector may be an avalanche photodiode, PIN photodiode, or silicon photomultiplier.

Generally, in an apparatus according to the present invention comprising a plurality of laser sources, each laser source will be a separate and controllable laser generating component. However, in embodiments of each laser source may be a single optical output of a separate laser generating component such that several (perhaps all) of the laser sources are the optical outputs of a single and separate laser generating component. For example, several of the laser sources may form an output of a single laser generating component by optically splitting the laser generated by said component. A laser may be optically split by an optical fibre splitter or any other suitable means. As will be readily understood if several laser sources are the output of a single laser generating component it will generally be necessary that all of said several laser sources are fired simultaneously during operation if the apparatus is operated using a pulsed laser rangefinding technique.

Any mirror or mirrors of the present invention may be formed of any suitable reflective element or combination thereof. For example, a mirror of the present invention may be formed of a suitable reflective surface such as a plane or curved mirror. As a further example, a mirror of the present invention may be formed of a reflective glass prism.

The present invention also provides a method of lidar scanning wherein;

a stationary laser source is controlled to emit light along an emission beam path that is incident upon a scanning mirror that reflects the light along a scanning beam path;

the scanning mirror is controlled to rotate about a scanning axis to sweep the scanning beam path about a surrounding environment;

light reflected by the surrounding environment is collected by a detector;

and distances from the scanning mirror to the surrounding environment along the swept scanning beam path are thereby calculated;

characterised in that the emission beam path is at an angle to the scanning axis.

The method of the present invention differs from methods according to prior art in that the emission beam path is located at an angle to the scanning axis. That is, the emission beam path is neither coincident with the scanning axis nor is it parallel to the scanning axis. The angle to the scanning axis may be any angle that allows the function of the method. For example, the angle may be greater than 0.1°, or greater than 0.5°, or greater than 1°.

The method is advantageous as by angling the emission beam path to the scanning axis it is possible to scan the scanning beam path about a path other than a horizontal plane or a conic section simply by rotating the scanning mirror about the scanning axis. Instead, the beam will sweep a path that varies in angle relative to the rotational axis of the scanning mirror as the mirror is rotated. Advantageously, it is not necessary to rotate or otherwise move either the laser source or the detector nor is it necessary to move the scanning mirror in a complex manner in order to achieve this.

Generally, the method of the present invention will be carried out using an apparatus according to the present invention, as discussed above.

The method of the present invention may operate using any appropriate laser rangefinding technique. For example, the method may be operated using a pulsed laser rangefinding technique, as is common in the art, wherein the stationary laser source is pulsed and time of flight of said pulses is used to calculate the distances to the surrounding environment. Alternatively, the method may be operated using an amplitude modulation rangefinding technique wherein the amplitude of the light emitted from the laser source is modulated and the amplitude modulation is used to calculate the distances to the surrounding environment. As a further alternative the method may be operated using a phase modulation rangefinding technique wherein the phase of the light emitted from the laser source is modulated and the phase modulation is used to calculate the distances to the surrounding environment.

The method of the present invention may be operated using a single laser source. However, it may be preferable that the method is operated utilising a plurality of laser sources that are each controlled to emit light along a different and associated emission beam path that is incident upon the scanning mirror and each emission beam path is at an angle to the scanning axis. Utilising a plurality of laser sources may be preferable as it allows the method of the present invention to be used to scan a 3D volume by moving only a single component (the scanning mirror) whilst holding the laser sources and the or each detector stationary.

It may be preferable that the method of the present invention is carried out using a plurality of laser sources it also utilises a different detector associated with each laser source and is used to collect light emitted from said laser source that has been reflected by the surrounding environment.

Further details and advantages of the present invention will be apparent from the embodiment shown in the Figures and described below.

BRIEF DESCRIPTION OF THE DRAWINGS

An embodiment of a lidar apparatus 11 according to the present invention is shown in FIGS. 2 and 4. FIG. 2 additionally illustrates the beam paths of the apparatus 11 whilst FIG. 4 shows only the components of the apparatus 11. As will be readily understood by the person skilled in the art the Figures illustrate only those features of the apparatus necessary in order to allow the operation of the apparatus 11 to be understood. All other features may be substantially as in the prior art (for example as in U.S. Pat. No. 5,455,669) or in any other equivalent manner that is apparent to the person skilled in the art or discussed in the summary of invention section above.

Figure 4:
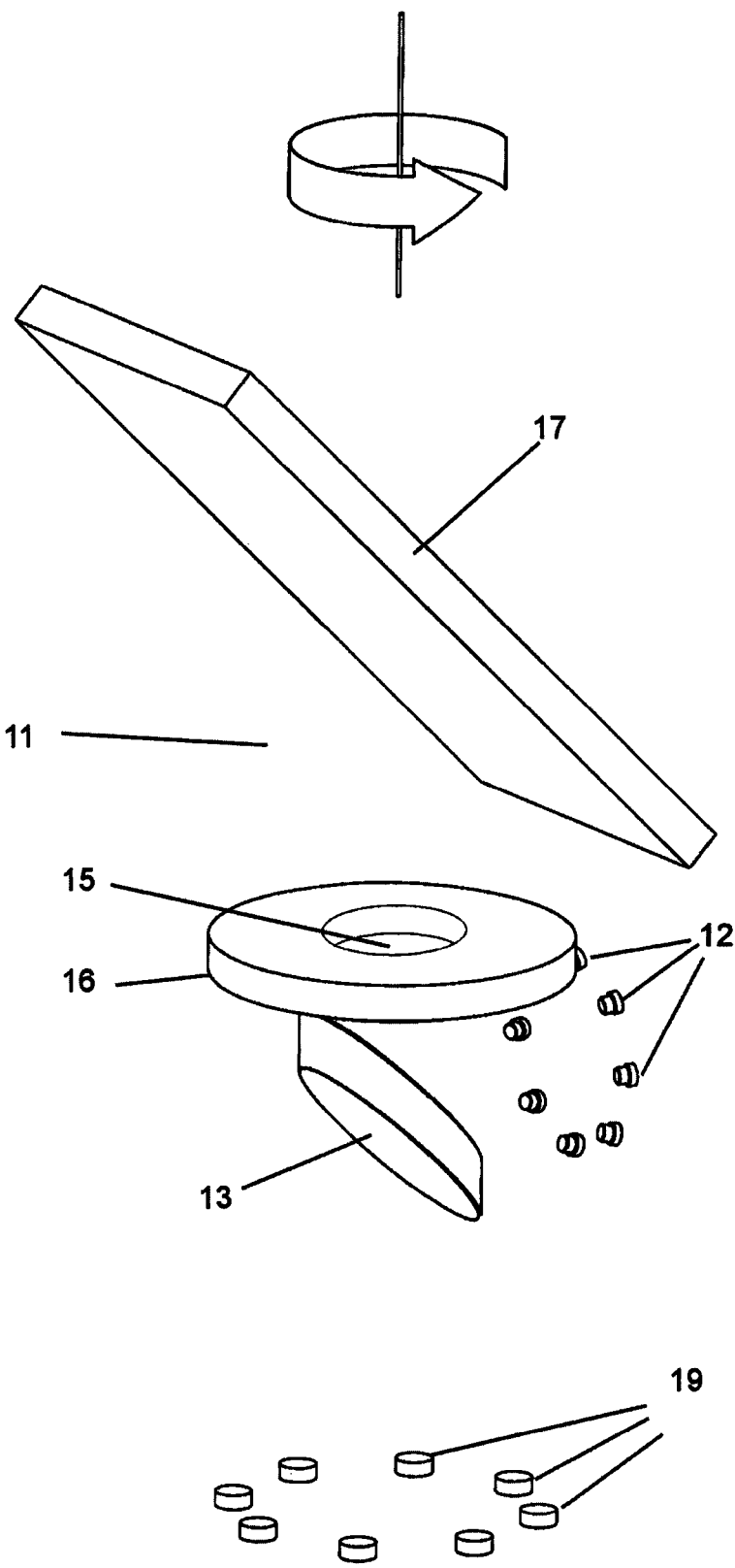
FIG. 4 is a schematic drawing showing the positioning of components of the FIG. 2.

The apparatus of the present invention 11 comprises a plurality of laser sources 12, each having a collimating lens, such that they each produce a laser beam that it is directed onto a 45° mirror 13. The laser beams are each reflected by the 45° mirror onto an emission beam path 14. The emission beam paths 14 pass through a central aperture 15 formed in a horizontally oriented receiving lens 16 and are incident upon a scanning mirror 17 (in FIG. 2 the scanning mirror is shown as being substantially oval whilst in FIG. 4 is shown as being rectangular, there is no functional difference between the shapes). The scanning mirror 17 further reflects each of the laser beams from their emission beam paths 14 onto a scanning beam path 18. In use the scanning mirror 17 is rotated about an axis of rotation. The axis of rotation of the scanning mirror 17 is coincident with the optical axis of the receiving lens 16. When a laser of a scanning beam path 18 is incident upon an external object at least a portion of the laser light is reflected back onto the scanning mirror 17 and is thereby reflected back down through the receiving lens 16. The receiving lens 16 is formed to focus this reflected light back down the emission beam path 14 of the relevant laser beam to a focal point that is located on an axis coincident with the emission beam path. A stationary detector 19 associated with the relevant laser source 12 is located at said focal point. During operation of the apparatus 11 the only part of the apparatus that is moved is the scanning mirror 17. All other components of the apparatus 11 are held stationary.

The apparatus 11 of the present invention is characterised in that each of the plurality of laser sources 12 is located such that the emission beam paths 18 are angled relative to the optical axis of the receiving lens 16 (and the coincident axis of rotation of the scanning mirror 17). This is advantageous as it allows the apparatus to comprise a plurality of laser sources 12 and in that the scanning beam paths 18 of each laser source 12 each trace a different path as the scanning mirror 17 is rotated such that a 3D point cloud of the volume surrounding the apparatus 12 can be created from the single apparatus 11. The operation of each laser source 12 and associated detector 19 to generate the 3D point cloud may be carried out in any appropriate manner.

Figure 1:
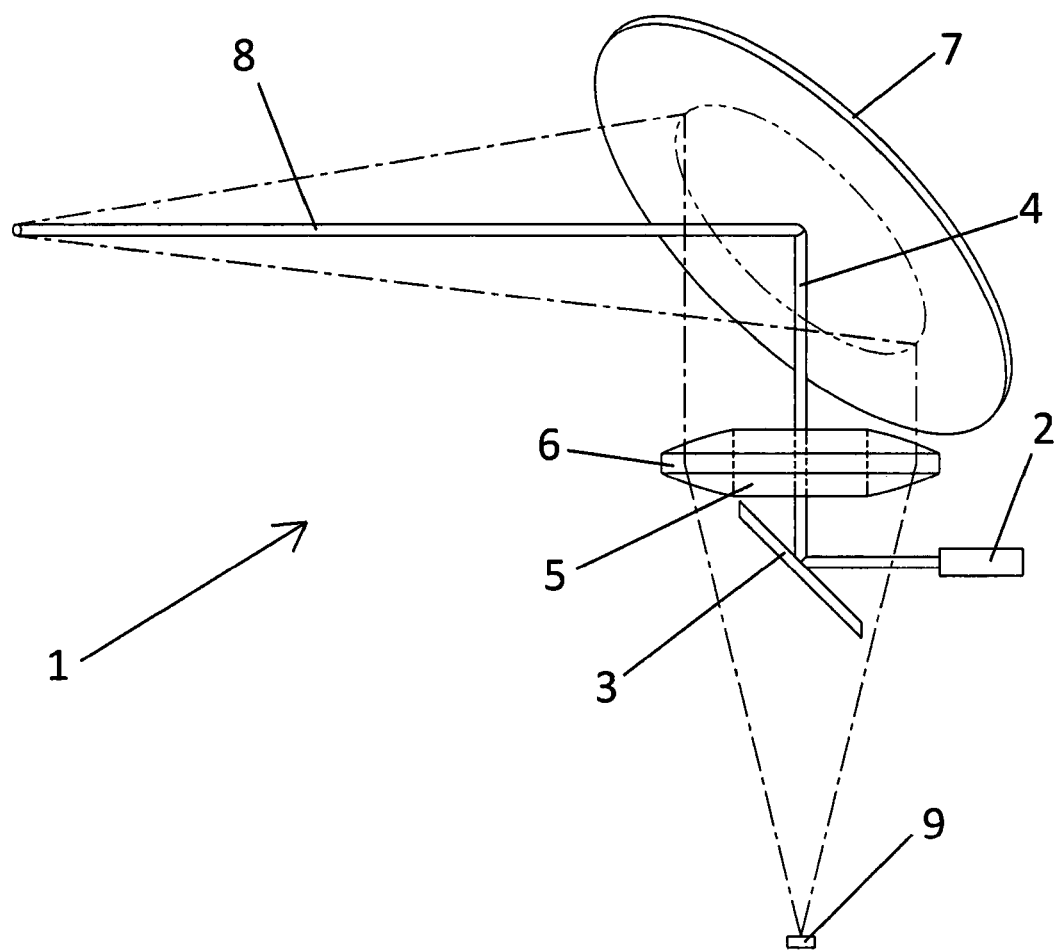
FIG. 1 shows an apparatus according to the prior art.
Figure 2:
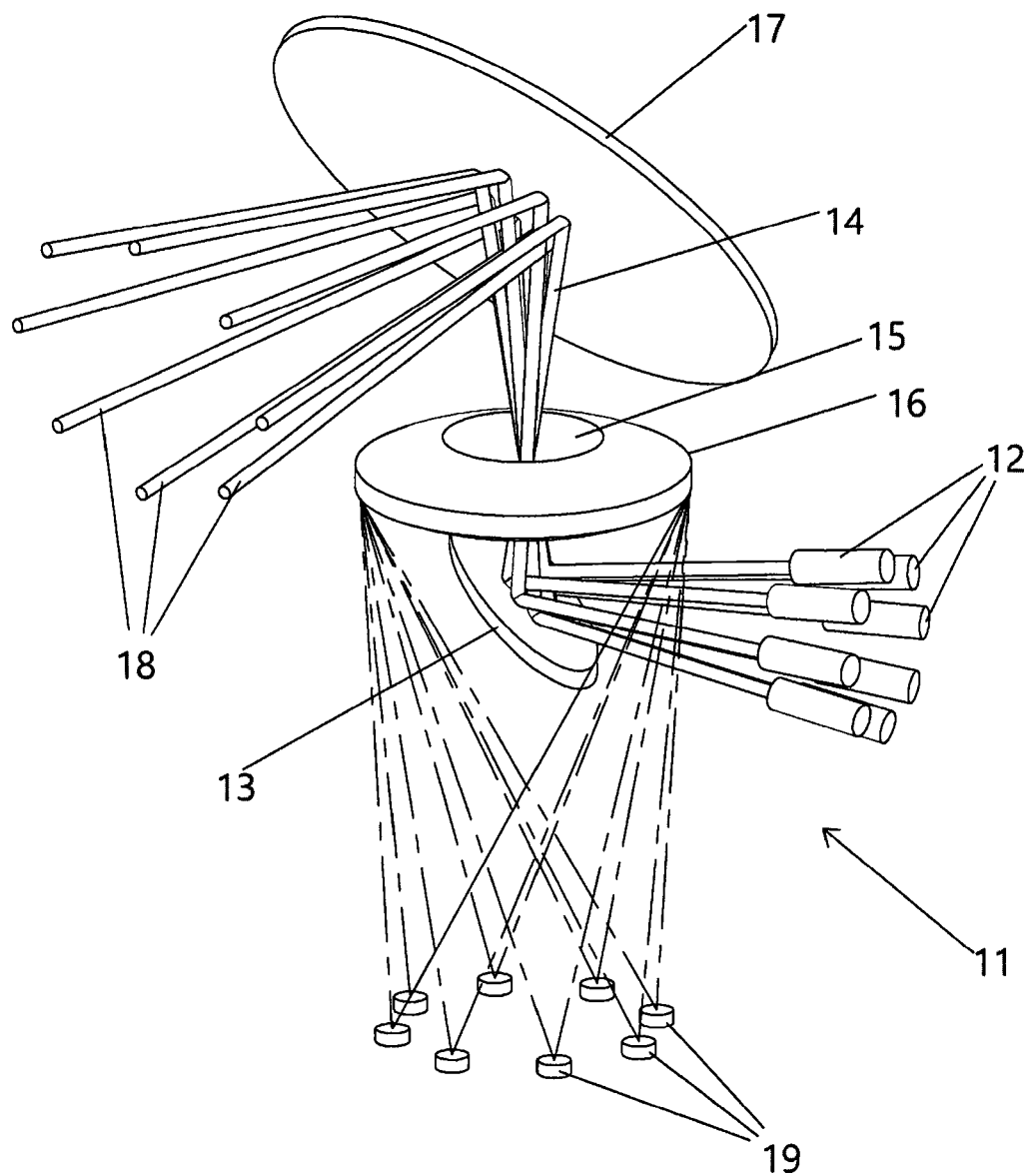
FIG. 2 shows an apparatus according to an embodiment of the present invention.
Figure 3:
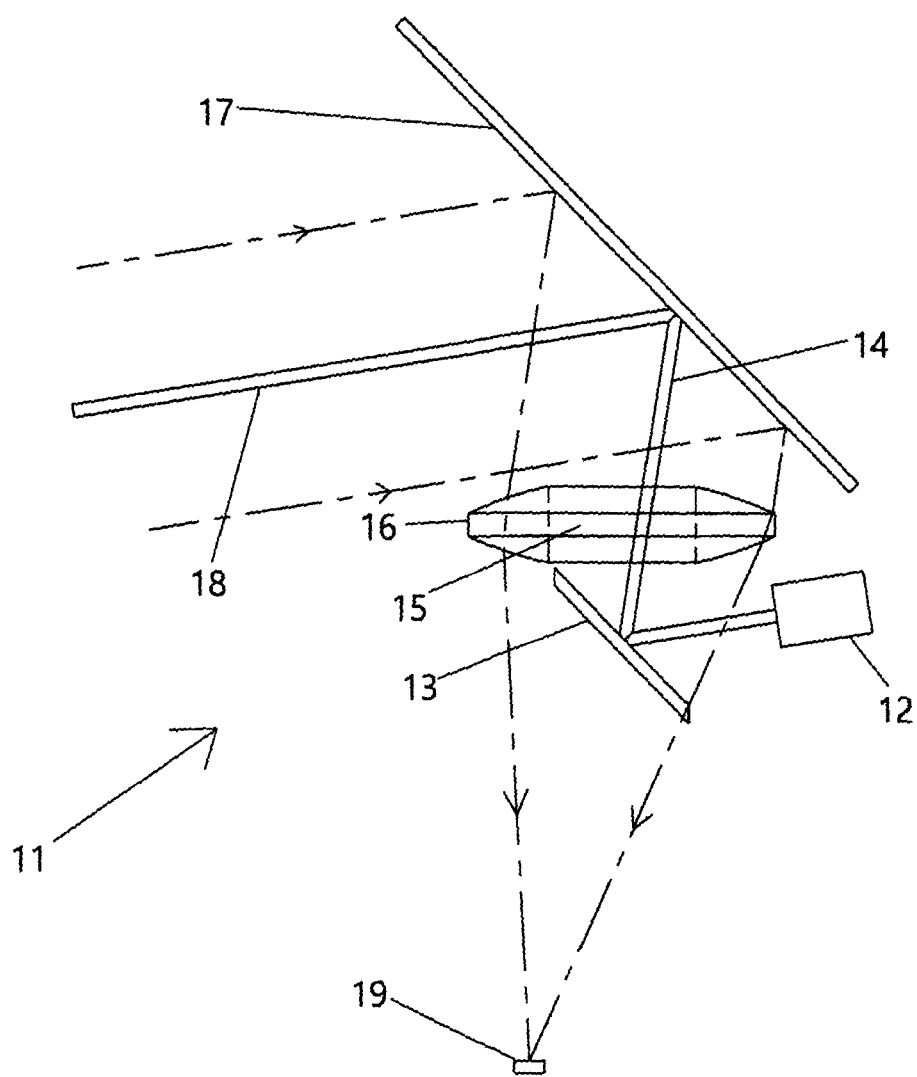
FIG. 3 shows the positioning of a single laser source and associated laser detector of the apparatus of FIG. 2.

In the apparatus 11 illustrated in FIGS. 2 and 4 the apparatus comprises eight laser sources 12 and associated detectors 19 such that there are eight separate emission beam paths 14 and eight separate scanning beam paths 18. The optical axis of the receiving lens 16 is substantially vertical. The laser sources 12 are positioned such that each of the emission beam paths 14 is located at the same polar angle relative to the optical axis. In addition the emission beam paths are equally spaced around the optical axis at a regular azimuthal spacing of 45°. The laser sources 12 are positioned such that emission beam paths 14 are coincident at the point at which they are incident upon the 90° mirror. As a result of the positioning of the emission beam paths 14 the detectors 19 are also located at regular 45° intervals about the optical axis of the receiving lens 16.

The location of an individual pair of laser source 12 and detector 19 and the resulting emission beam path 14 and scanning beam path 18 can be best seen in FIGS. 3 to 6. As will be readily understood, as the scanning mirror 17 is rotated the angle of the scanning beam path 18 to the horizontal will change such that the scanning beam path 18 does not trace a circular plane or a conic section but traces a path that has a maximum positive angle relative to the horizontal at a first angle of rotation of the scanning mirror, a maximum negative angle relative to the horizontal at a second angle of rotation of the scanning mirror that is 180° from the first angle, and that is substantially horizontal at third and fourth angles relative to the first angle that are 90° and 270° from the first angle respectively. As the scanning mirror 17 is rotated the eight different scanning beam paths will each trace a separate and distinct path about the apparatus 11. The combination of the eight scanning beam paths allows for excellent three-dimensional mapping of a volume surrounding the apparatus 11.

Figure 5:
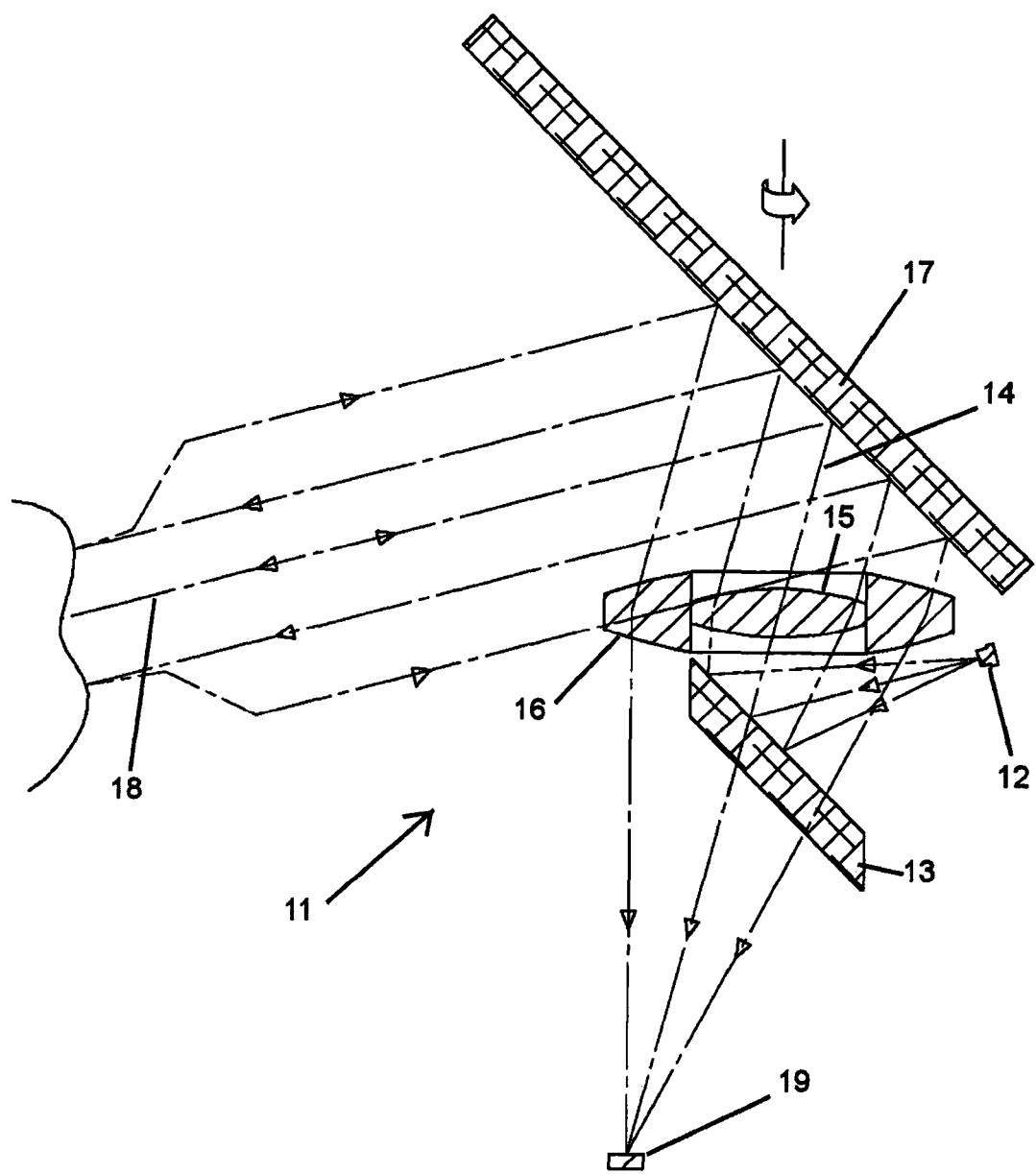
FIG. 5 is a cross-section through the embodiment of FIG. 2 showing the rotating mirror in a first position.
Figure 6:
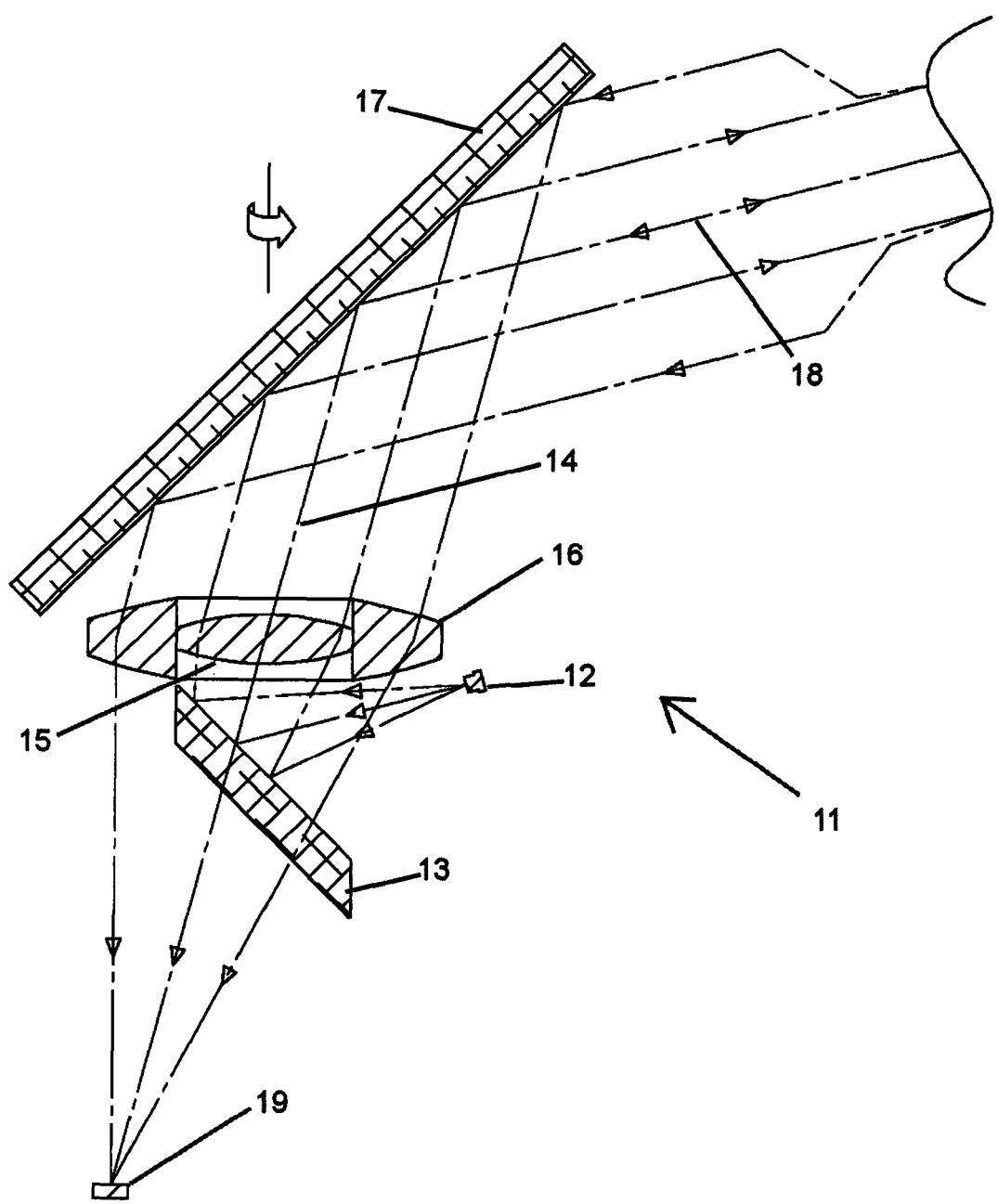
FIG. 6 is a cross-section through the embodiment of FIG. 2 showing the rotating mirror in a second position, 180° from the first position.

The emission beam path 14 and scanning beam path 18 of an individual pair of laser source 12 and detector 19 in which the scanning mirror 17 is in a first position (nominally) 0° is shown in FIG. 5. The emission beam path 14 and scanning beam path 18 of the same laser source 12 and detector 19 in which the scanning mirror 17 is at a second position that is 180° from the first position is shown in FIG. 6. The only component of the apparatus 11 that has changed position is the scanning mirror 17, which has rotated through 180°. In the first position the scanning beam path 18 has a maximum negative angle relative to the horizontal and in the second position the scanning beam path has a maximum positive angle relative to the horizontal.

The specific direction of an scanning beam path 18 is a function of the tilt and current rotational position of the scanning mirror 17 relative to an axis through the nominal position of the relevant laser source 12 (i.e. the position the laser source 12 would be in if the beam were not reflected or otherwise diverted before being incident upon the scanning mirror). Equations for the direction and path of an scanning beam path 18 for any specific embodiment of an apparatus 11 according to the present invention would be able to be deduced by the person skilled in the art without difficulty. The beam paths (Elevation versus Azimuth) of an embodiment of an apparatus 11 according to the present invention are plotted in FIG. 7.

Figure 7:
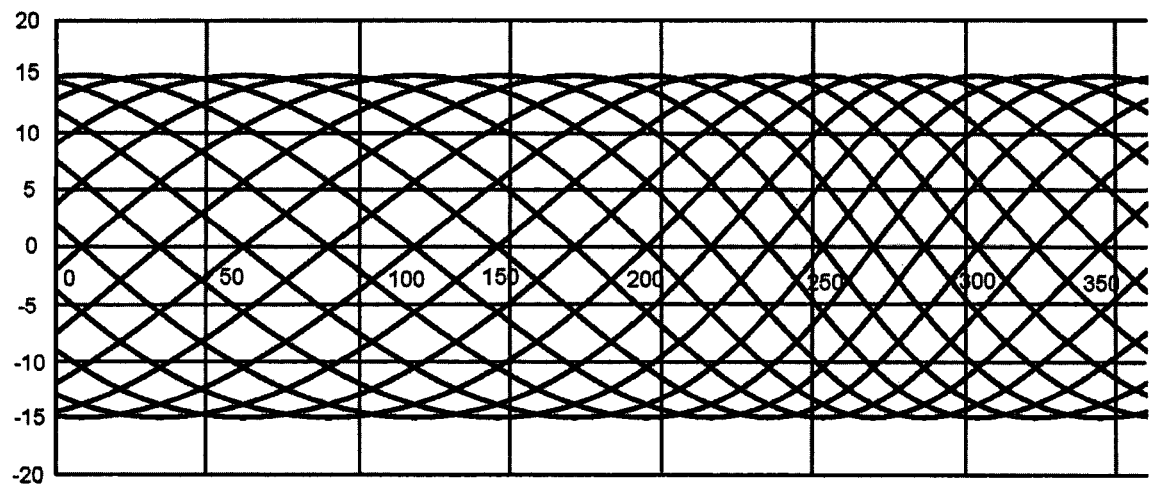
FIG. 7 is a graph showing illustrative scanning beam paths of lasers of an embodiment of the invention.

FIG. 7 is a graph showing the scanning beam paths 18 of an embodiment of an apparatus 11 according to the present invention comprising 16 laser sources that are equally spaced about the optical axis and positioned at the same angle to the optical axis. The graph shows the height of the scanning beam paths 18 at a set radial distance from the optical axis as the scanning mirror 17 is rotated. The vertical axis of the graph being the height of the scanning beam paths 18 and the horizontal axis being the rotational position of the scanning mirror 17. As can be seen, each scanning beam paths 18 scans a curve between a maximum height at a first angle of rotation of the scanning mirror 17 and a minimum height at a second angle of rotation of the scanning mirror 17 that is 180° from the first angle. By having 16 laser sources 12 that are evenly spaced around the optical axis a volume around the apparatus between said maximum height and said minimum height can be scanned simply by rotating the scanning mirror 17 without any need to rotate any other component.

Figure 8:
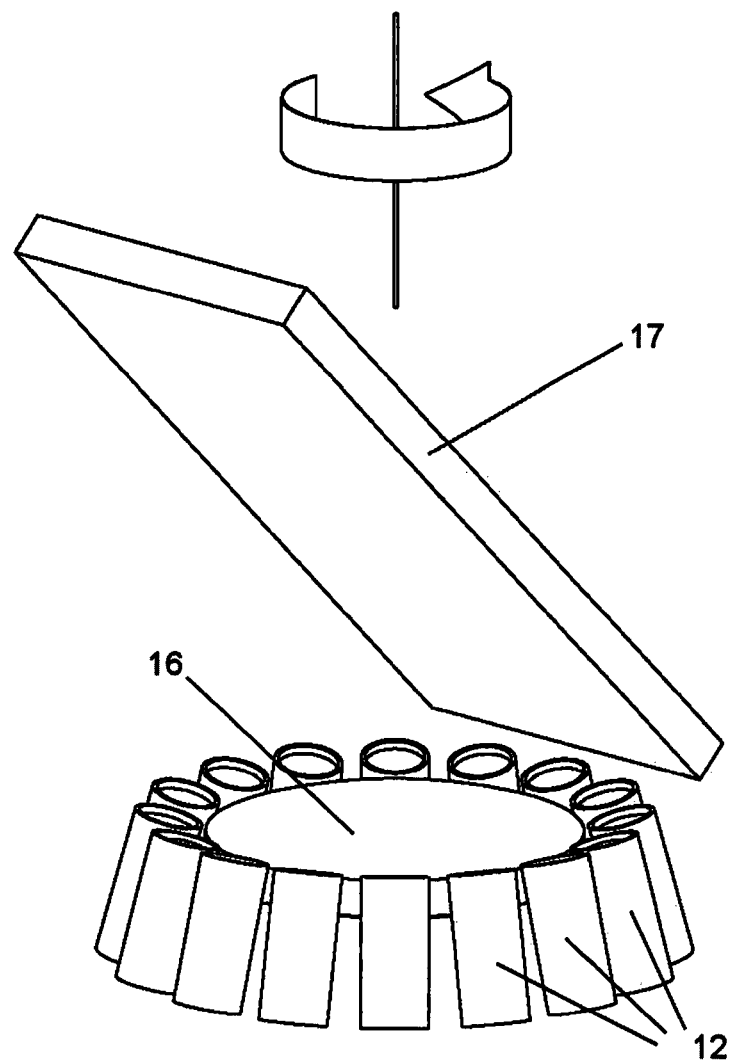
FIG. 8 is a schematic drawing of an alternative embodiment of an apparatus according to the present invention.
Figure 8:
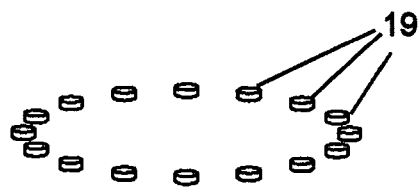

FIG. 8 shows an embodiment of an apparatus 11 according to the present invention in which the laser sources 12 are positioned around the receiving lens 16. As a result, the receiving lens does not require a central aperture 15 and the emission beam paths 14 do not pass through the receiving lens. Further, there is no need for a 45° mirror 13 to reflect the laser beams from the laser sources 12 onto the emission beam paths 18. Instead the laser sources emit laser beams directly along the emission beam paths 18. Otherwise, the operation of the embodiment of the apparatus 11 of FIG. 8 is the same as the operation of the apparatus of FIGS. 2 to 6.

Figure 9:
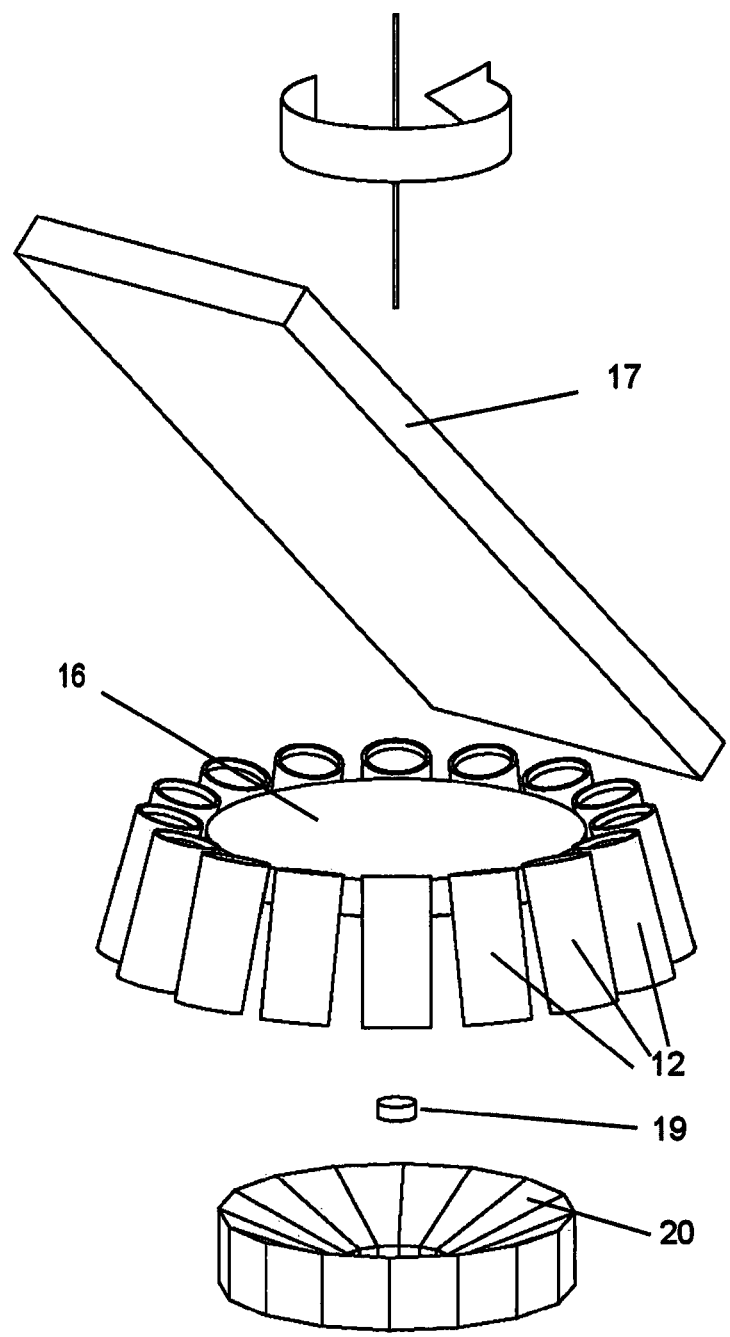
FIG. 9 is a schematic drawing of a further alternative embodiment of an apparatus according to the present invention.

FIG. 9 shows an embodiment of an apparatus 11 according to the present invention that is formed in the same manner as the apparatus of FIG. 8 with the laser sources 12 positioned around the receiving lens 16. However, rather than having a separate detector 19 for each laser source 12 the apparatus 11 has only a detector 19 that detects light from each of the laser sources 12. The reflected light from each laser source 12 is further reflected onto the single detector by means of a reflector 20 positioned at a lower end of the apparatus 11 and formed to reflect light from the position of the detectors 19 in the embodiment of FIG. 8 onto the single detector 19. In order that the apparatus can operate with a single detector 19 it may be preferable that the laser sources 12 are fired sequentially such that they don't interfere with each other. However, it is considered that the person skilled in the art will readily understand how to operate an apparatus 11 with a plurality of laser sources 12 and a single detector 19.

The invention claimed is:

1. A lidar apparatus comprising:
a receiving lens having an optical axis;
a scanning mirror angled to the optical axis of the receiving lens and controlled to rotate around scanning axis;
a stationary laser source that is positioned to emit light along an emission beam path that is reflected by the scanning mirror along an associated scanning beam path, and the emission path is located at an angle of greater than 0.1° to the scanning axis; and
a detector associated with the laser source and positioned to receive light from said laser source that is reflected by external objects and returned through the receiving lens and via the scanning mirror.

2. The apparatus according to claim 1, wherein the scanning axis is coincident with the optical axis.

3. The apparatus according to claim 1, further comprising a single reflecting mirror for reflecting the light emitted from the laser source onto the emission beam path.

4. The apparatus according to claim 3, wherein the reflecting mirror is a 45° mirror.

5. The apparatus according to claim 1, wherein the scanning mirror is integral with the receiving lens.

6. The apparatus according to claim 1, wherein the detector comprises a plurality of stationary detectors, each detector associated with the stationary laser source and positioned to receive light from said laser source that is reflected by the external objects and returned through the receiving lens and via the scanning mirror.

7. The apparatus according to claim 1, wherein the stationary laser source comprises a plurality of stationary laser sources that are each positioned to emit light along an associated and different emission beam path, each said emission beam path being reflected by the scanning mirror along an associated and different scanning beam path.

8. The apparatus according to claim 7, wherein the detector is associated with each of the plurality of laser sources and is positioned to receive light from each of said laser sources that is reflected by the external objects and returned through the receiving lens and via the scanning mirror.

9. The apparatus according to claim 7, wherein the detector comprises a plurality of stationary detectors, each stationary detector associated with one or more of the plurality of laser sources and positioned to receive light from said one or more of the plurality of laser sources that is reflected by the external objects and returned through the receiving lens and via the scanning mirror.

10. The apparatus according to claim 9, wherein only one of the plurality of stationary detectors is associated with each of the plurality of laser sources.

11. The apparatus according to claim 7, wherein the emission beam paths are equally rotationally spaced around the optical axis.

12. The apparatus according to claim 7, wherein the plurality of laser sources comprise six or more laser sources.

13. The apparatus according to claim 7, wherein the plurality of laser sources comprise twelve or more laser sources.

14. The apparatus according to claim 7, wherein the plurality of laser sources are all mounted in the same plane.

15. The apparatus according to claim 7, wherein the plurality of laser sources are mounted on a single pcb or integrated circuit.

16. The apparatus according to claim 7, wherein each emission beam path is offset from the optical axis of the receiving lens by the same angle.

17. The apparatus according to claim 7, further comprising a single collimator for collimating the laser beams from each of the laser sources.

18. The apparatus according to claim 17, wherein the single collimator is located on the optical axis of the receiving lens.

19. The apparatus according to claim 1, wherein the laser source is positioned such that the emission beam path passes through the receiving lens.

20. The apparatus according to claim 19, wherein the emission beam path passes through a central aperture formed in the receiving lens.

21. The apparatus according to claim 1, wherein the laser source is positioned such that the emission beam path does not pass through the receiving lens.

22. The apparatus according to claim 1, further comprising a collimator integrally formed with the laser source.

23. The apparatus according to claim 1, further comprising an on-axis laser source that is positioned on the optical axis of the receiving lens and an associated on-axis detector that is positioned on the optical axis of the receiving lens wherein the emission beam path of the on-axis laser source is coincident with the scanning axis.

24. A method of lidar scanning comprising:
controlling a stationary laser source to emit light along an emission beam path that is incident upon a scanning mirror that reflects the light along a scanning beam path;
locating the emission beam path at an angle of greater than 0.1° to a scanning axis;
controlling the scanning mirror to rotate around the scanning axis to sweep the scanning beam path around a surrounding environment;
collecting the light reflected by the surrounding environment using a detector; and
calculating distances from the scanning mirror to the surrounding environment along the swept scanning beam path.

25. The method of lidar scanning according to claim 24, further comprising:
pulsing the stationary laser source; and
calculating the distances to the surrounding environment using a time of flight of said pulses.

26. The method of lidar scanning according to claim 24, further comprising:
modulating the amplitude of the light emitted from the laser source; and
calculating the distances to the surrounding environment using the amplitude modulation.

27. The method of lidar scanning according to claim 24, further comprising:
Modulating the phase of the light emitted from the laser source; and
calculating the distances to the surrounding environment using the phase modulation.

28. The method of lidar scanning according to claim 24, further comprising:
controlling each of the plurality of laser sources to emit light along a different and associated emission beam path that is incident upon the scanning mirror and each emission beam path is at an angle to the scanning axis.

29. The method of lidar scanning according to claim 28, wherein:
a different detector is associated with each laser source and is used to collect light emitted from said laser source that has been reflected by the surrounding environment.

30. The method of lidar scanning according to claim 24, further comprising providing a lidar apparatus comprising a receiving lens having an optical axis, the scanning mirror angled to the optical axis of the receiving lens, the stationary laser, and the detector positioned collect the light reflected by the surrounding environment through the receiving lens.

* * * * *